United States Patent
Chaney et al.

(10) Patent No.: US 6,843,912 B2
(45) Date of Patent: Jan. 18, 2005

(54) COMBINED FILTER MANIFOLD AND SHUT-OFF VALVE FOR A WATER PURIFICATION SYSTEM

(75) Inventors: David B. Chaney, Westerville, OH (US); Galen L. Gerig, Columbus, OH (US)

(73) Assignee: Oasis Corporation, Columbus, OH (US)

( * ) Notice: Subject to any disclaimer, the term of this patent is extended or adjusted under 35 U.S.C. 154(b) by 156 days.

(21) Appl. No.: 10/092,838

(22) Filed: Mar. 7, 2002

(65) Prior Publication Data

US 2002/0125183 A1 Sep. 12, 2002

Related U.S. Application Data

(60) Provisional application No. 60/274,329, filed on Mar. 8, 2001.

(51) Int. Cl.$^7$ ............................................. B01D 35/157
(52) U.S. Cl. ...................... 210/234; 210/323.1; 210/418
(58) Field of Search ................................ 210/328–330, 210/335, 340, 418–424, 341, 345, 323.1–323.2, 444, 459, 460, 234–235, 237–238, 245

(56) References Cited

U.S. PATENT DOCUMENTS

| | | | | |
|---|---|---|---|---|
| 1,861,805 A | * | 6/1932 | Lentz | .......................... 210/440 |
| 3,399,776 A | * | 9/1968 | Knuth | .......................... 210/234 |
| 3,746,171 A | | 7/1973 | Thomsen | |
| 4,476,015 A | * | 10/1984 | Schmitt et al. | ................ 210/93 |
| 5,045,197 A | | 9/1991 | Burrows | |
| 5,101,850 A | | 4/1992 | Todd | |
| 5,435,909 A | | 7/1995 | Burrows | |
| 5,567,311 A | * | 10/1996 | Jang | ........................... 210/243 |
| 5,591,332 A | | 1/1997 | Reid et al. | |
| 5,744,030 A | | 4/1998 | Reid et al. | |
| 5,766,453 A | * | 6/1998 | Morellato et al. | ........... 210/143 |
| 5,893,969 A | | 4/1999 | Goldman | |
| 2002/0104794 A1 | * | 8/2002 | Hoffmann | ................. 210/323.2 |

* cited by examiner

Primary Examiner—Terry K. Cecil
(74) Attorney, Agent, or Firm—Kelly Lowry & Kelly, LLP

(57) ABSTRACT

A filter manifold is provided in a water purification system and includes at least one filter element for producing relatively purified water, wherein the filter manifold incorporates a shut-off valve designed to prevent filter element removal unless the shut-off valve is first switched to a closed position for turning off the incoming water supply. The shut-off valve includes an elongated actuator lever which in a normal open position engages and retains a manifold latch plate in a latched position retaining the filter elements in connected relation with flow couplers to produce purified water. Upon movement of the actuator lever to a closed position shutting off the incoming water supply, the manifold latch plate can be unlatched from the filter elements to permit filter element removal and replacement.

12 Claims, 6 Drawing Sheets

COMBINED FILTER MANIFOLD AND SHUT-OFF VALVE FOR A WATER PURIFICATION SYSTEM

This application claims the benefit of U.S. Provisional Application No. 60/274,329, filed Mar. 8, 2001.

BACKGROUND OF THE INVENTION

This invention relates generally to water purification systems of the type having one or more filter elements for producing a supply of filtered or relatively purified water, wherein the filter elements are supported in a filter manifold for relatively quick and easy removal and replacement. More particularly, this invention relates to an improved water purification system further including a shut-off valve for turning off an incoming water supply, and for preventing filter element removal from the filter manifold unless the shut-off valve is in a closed position.

Water purification systems are generally well known in the art for producing a purified water supply used for drinking, cooking, etc. Such purification systems commonly employ one or more filter elements connected to an incoming water supply such as a standard tap water inflow. The filter elements appropriately filter or otherwise purify the water inflow to produce a relatively purified water supply which is coupled to a reservoir where it is stored pending on-demand dispensing via a faucet valve or the like. In one common configuration, the purification system comprises a plurality of filter elements including particulate filtration, carbon filtration, and a reverse osmosis (RO) membrane supported on or in a manifold constructed for suitably connecting each filter element to mating flow couplers for normal purification operation, while additionally accommodating relatively quick and easy removal and replacement of each filter element. See, for example, U.S. Pat. Nos. 5,045,197; 5,435,909; 5,591,332; and 5,744,030, which are incorporated by reference herein. Such purification systems have been designed for under-counter installation in association with a kitchen sink or the like, or in a stand-alone so-called point-of-use water cooler.

In water purification systems of the type described above, removal and replacement of each filter element is required on a periodic basis to maintain the quality of the produced purified water. The manifold filter element geometry is designed to facilitate filter element changeover, while insuring that each replacement filter element is properly connected for flow-through water passage at the correct location. However, before any one of the filter elements is removed from the manifold, it is first necessary to turn off the incoming water flow. Unfortunately, shutting off the incoming water flow requires the user to locate and properly operate an inflow shut-off valve before a filter element is removed. Prior manifold systems designed for quick and easy filter element changeover have not provided any means for safeguarding against undesired filter element removal before the incoming water supply is turned off. In this regard, filter element removal without first turning off the water supply can result in significant water leakage and potential damage to adjoining flooring materials and the like.

The present invention overcomes these problems and disadvantages by providing an improved filter manifold for a water purification system wherein a shut-off valve must be closed to turn off the incoming water supply before a filter element can be removed from the manifold.

SUMMARY OF THE INVENTION

In accordance with the invention, an improved filter manifold is provided for use in a water purification system such as a point-of-use water cooler or the like and includes at least one filter element for producing relatively purified water, wherein the filter manifold incorporates a shut-off valve designed to prevent filter element removal unless the shut-off valve is first switched to a closed position for turning off the incoming water supply. The shut-off valve includes an elongated actuator lever which, in a normal open position, engages and retains a manifold latch plate in a latched position to lock the filter elements in connected relation with flow couplers to produce purified water. Upon movement of the actuator lever to a closed position shutting off the incoming water supply, the manifold latch plate can be unlatched or unlocked from the filter elements to permit filter element removal and replacement.

In one preferred form of the invention, the filter manifold defines a plurality of mounting stations for receiving and supporting a plurality of filter elements or cartridges in side-by-side relation, and connected respectively to a sequence of flow couplers for flow-through passage and appropriate purification of an incoming water supply, such as tap water. A water inflow conduit is coupled to a first filter element mounting station, and a water outflow conduit is coupled from a final filter element mounting station to a reservoir for storing purified water for on-demand dispensing. The latch plate is pivotally mounted on the manifold over one end of the filter elements and is movable between a normal latched position engaging and retaining the filter elements in connected relation with the flow couplers, and an unlatched position to accommodate filter element removal and replacement. The shutoff valve is connected in-line along the water inflow conduit upstream from the first filter element mounting station.

The elongated actuator lever of the shut-off valve is positioned to block or obstruct movement of the manifold latch plate from the latched to the unlatched position, when the actuator lever is in a normal open position permitting water flow to the filter elements. However, when the actuator lever is shifted to the closed position to shut off the incoming water flow, the lever is displaced to an out-of-the-way position permitting the manifold latch plate to be moved to the unlatched position whereupon any or all of the filter elements can be replaced quickly and easily without risk of significant water leakage.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
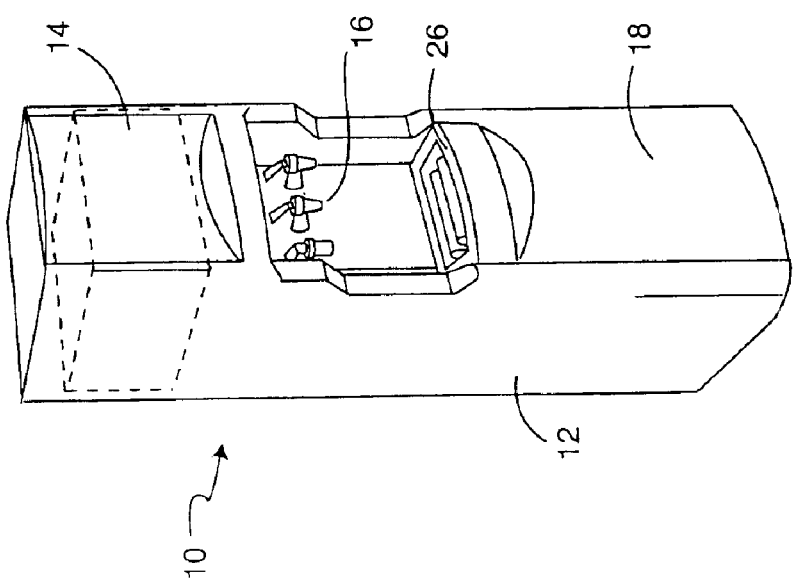
FIG. 1 is a front perspective view of a point-of-use water cooler of a type equipped with the combined filter manifold and shut-off valve embodying the novel features of the invention.
Figure 3:
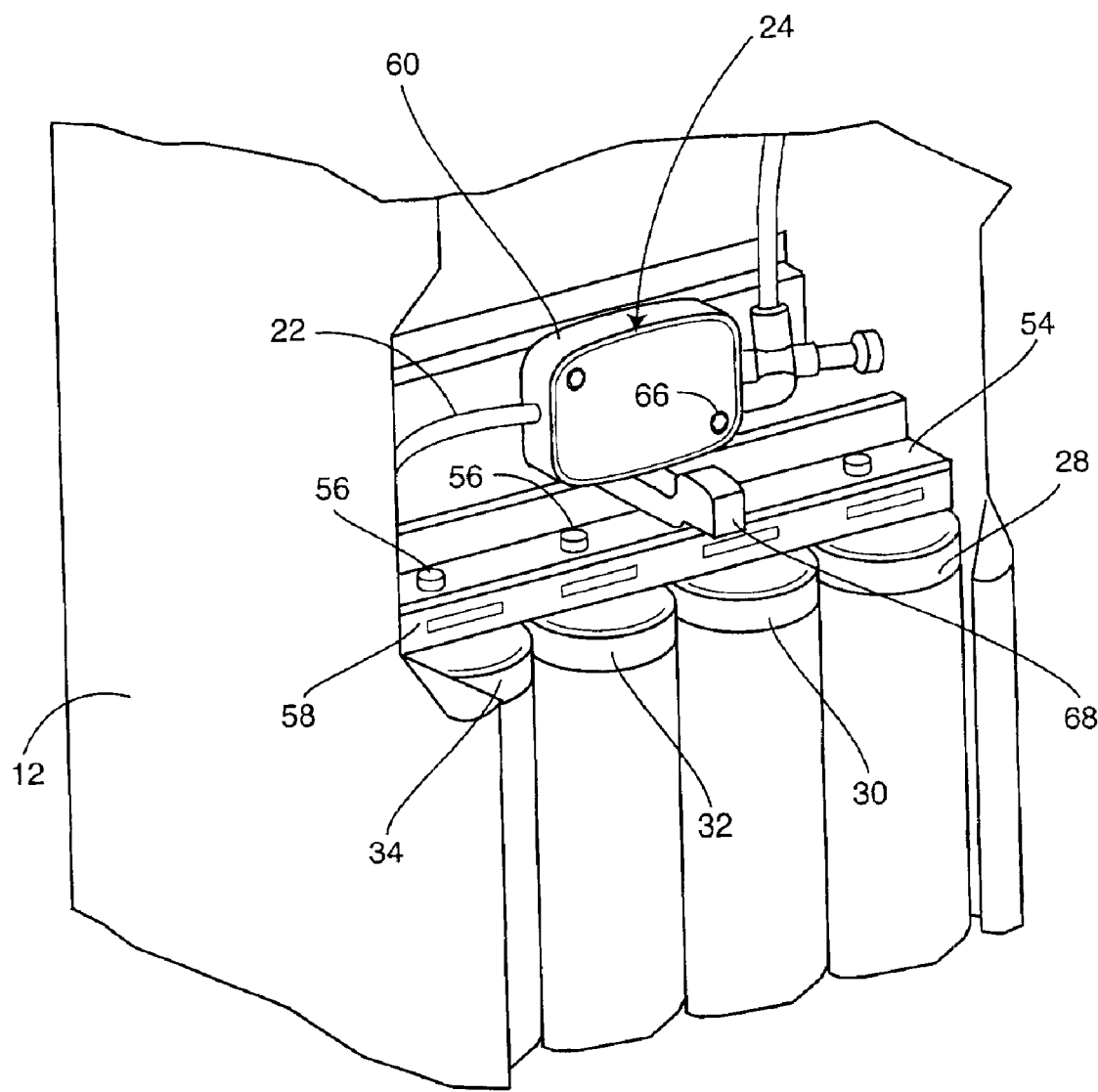
FIG. 3 is a further enlarged and fragmented front perspective view corresponding with a portion of FIG. 2, and illustrating the shut-off valve in a normal open position.
Figure 5:
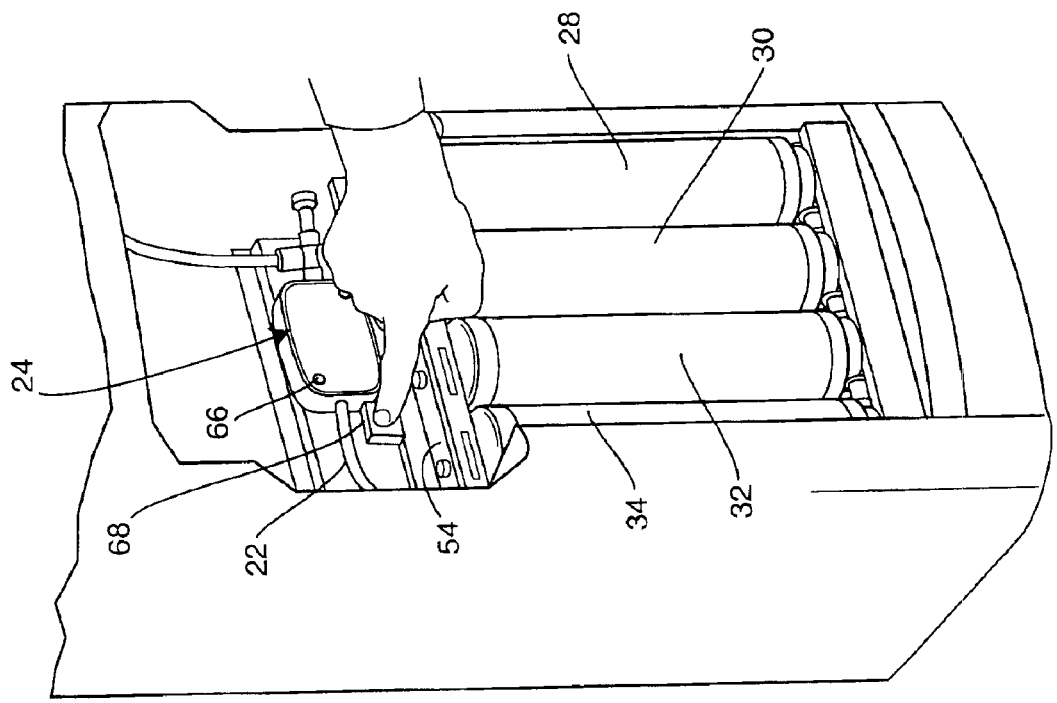
FIG. 5 is a fragmented perspective view similar to FIG. 4, showing the shut-off valve in the closed position.
Figure 4:
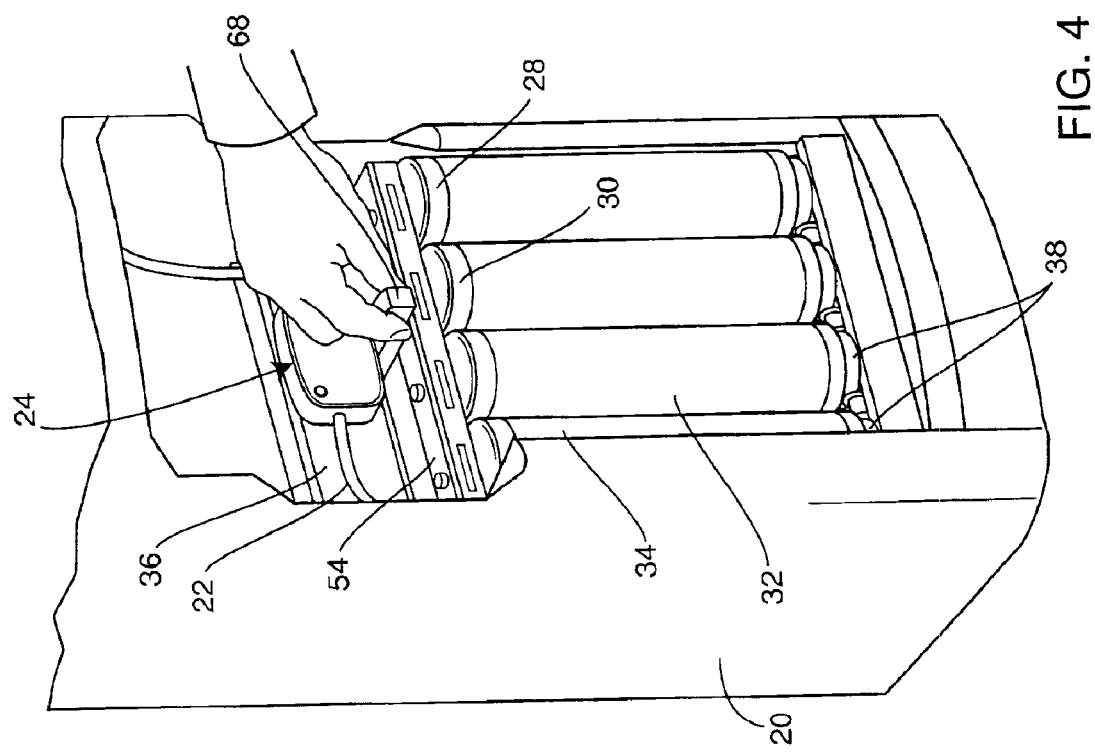
FIG. 4 is a fragmented perspective view similar to FIG. 3, and showing manual grasping of a control handle for closing the shut-off valve.

As shown in the exemplary drawings, a point-of-use water cooler is referred to generally in FIG. 1 by the reference numeral 10. The water cooler comprises a relatively compact cooler cabinet or housing 12 containing a water reservoir 14 (shown in dotted lines in FIG. 1) within an upper region thereof for receiving and storing a supply of relatively purified water for on-demand dispensing via one or more faucet valves 16 mounted on a front face of the cooler cabinet 12. A front access panel 18 forming a lower portion of the cooler cabinet 12 is removable as viewed in FIG. 2 to permit access to a water purification system 20. The purification system 20 includes multiple filter elements or cartridges coupled via a water supply conduit 22 to an incoming flow of water, such as common tap water, and functions to produce a supply of relatively purified water delivered to and stored within the cooler reservoir 14. In accordance with the invention, a shut-off valve 24 is mounted along the length of the water supply conduit 22 and interacts with the filter elements to provide a locking means for preventing filter element removal and replacement unless the shut-off valve 24 is first moved to a closed position turning off the incoming water flow.

Figure 2:
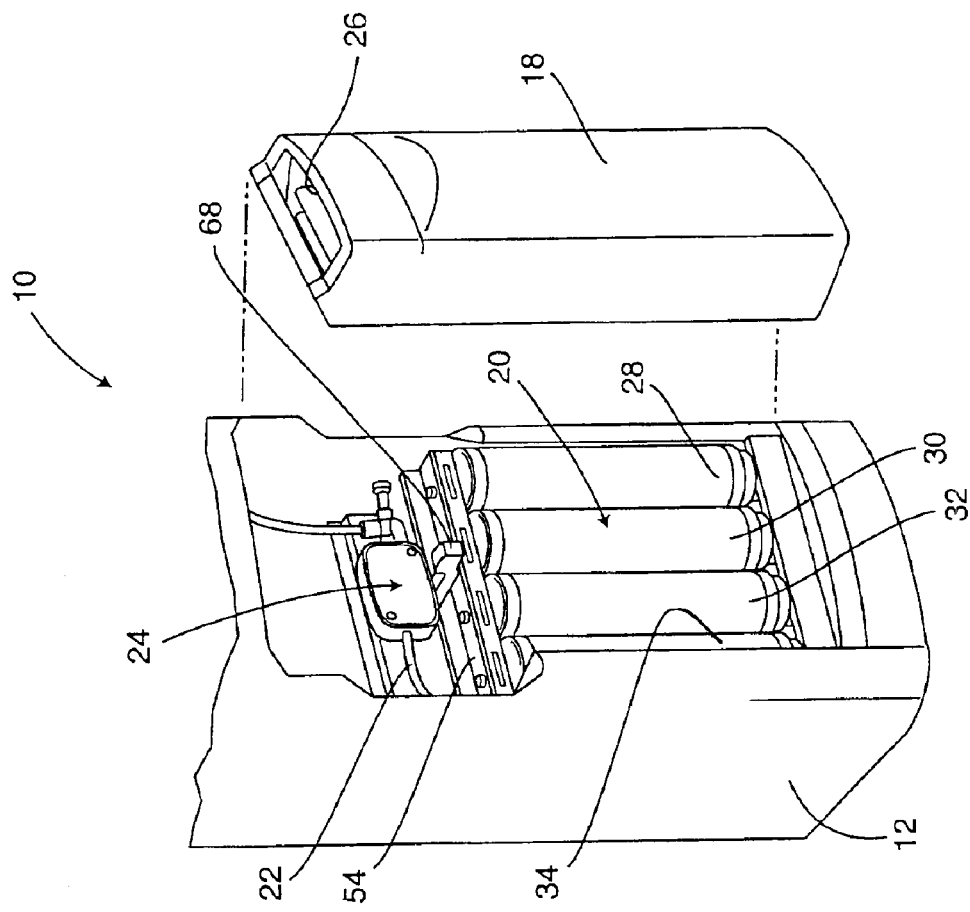
FIG. 2 is an enlarged and fragmented front perspective view of a portion of the water cooler of FIG. 1, with a lower access panel removed to reveal the combined filter manifold and shut-off valve of the present invention.

The illustrative drawings shown the water purification system 20 for use in the so-called point-of-use water cooler 10 comprising a relatively compact and stand-alone apparatus for producing and storing purified water within the cooler reservoir 14. Such water coolers commonly incorporate a subdivided reservoir or multiple reservoirs (not shown) for dispensing water from different faucet valves 16 at different temperatures, such as refrigerated water, room temperature water, and hot water as in the embodiment depicted in FIG. 1 with three separate faucet valves. A drip tray 26 is normally provided in general vertical alignment below the faucet valves 16, wherein FIGS. 1 and 2 show this drip tray 26 formed or mounted at the upper end of the cabinet access panel 18. The purification system 20 generally and commonly comprises an array or bank of filter elements for filtering or purifying the water flow passed therethrough, such as a sediment filter cartridge 28, a pre-carbon filter cartridge 30, a reverse osmosis (RO) membrane cartridge 32, and a carbon filter cartridge 34 as shown. The water inflow to the purification system 20 passes in-line through this sequence of filter cartridges or elements to produce the relatively purified water delivered via a suitable outflow conduit to the cooler reservoir 14. As is known in the art, the reverse osmosis membrane 32 separates the water flow into a first relatively purified water flow for delivery ultimately to the cooler reservoir 14, and a second relatively impure or brine water flow discharged to a waste drain (not shown).

While the water purification system 20 is shown in the accompanying drawings for use in a point-of-use water cooler 10, and includes the bank of four successive filter elements 28, 30, 32 and 34 including reverse osmosis purification, persons skilled in the art will recognize and appreciate that alternative system configurations may be used. For example, the purification system 20 may include particulate and/or carbon filtration elements without incorporating reverse osmosis purification. Moreover, the purification system may be employed in an under-counter configuration with the system components mounted within a typical kitchen cabinet structure typically beneath a sink for convenient connection to a tap water supply.

Figure 6:
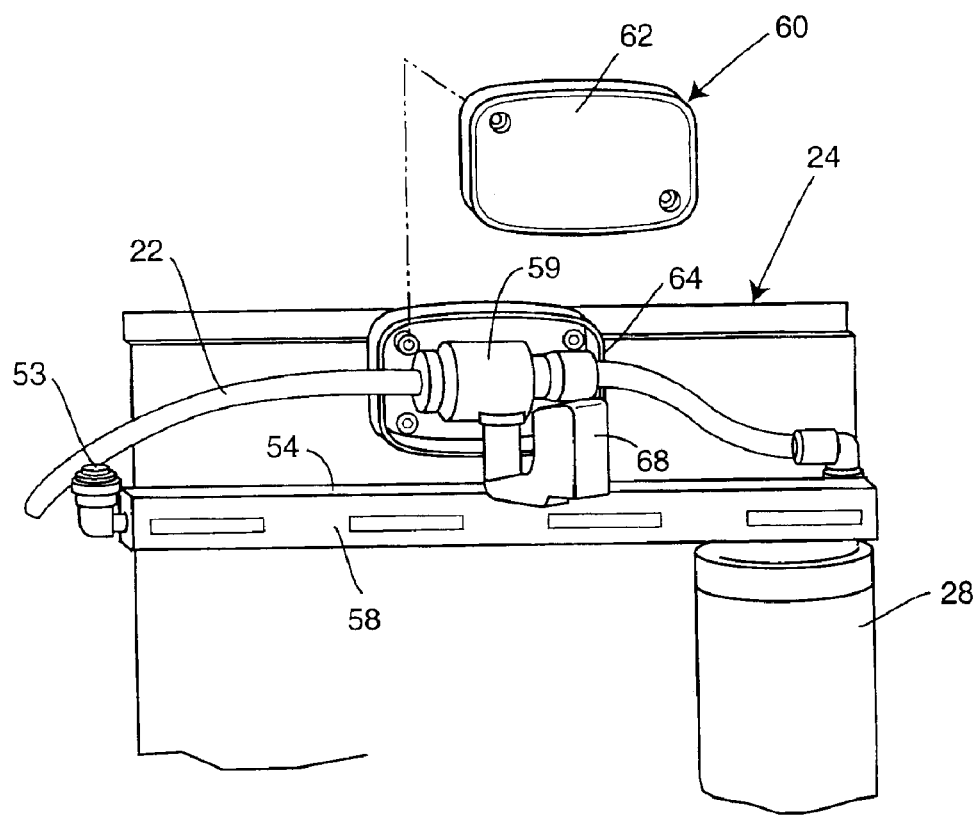
FIG. 6 is a further enlarged and exploded perspective view depicting a shut-off valve unit mounted within a valve housing, with the shutoff valve unit shown in the open position.
Figure 7:
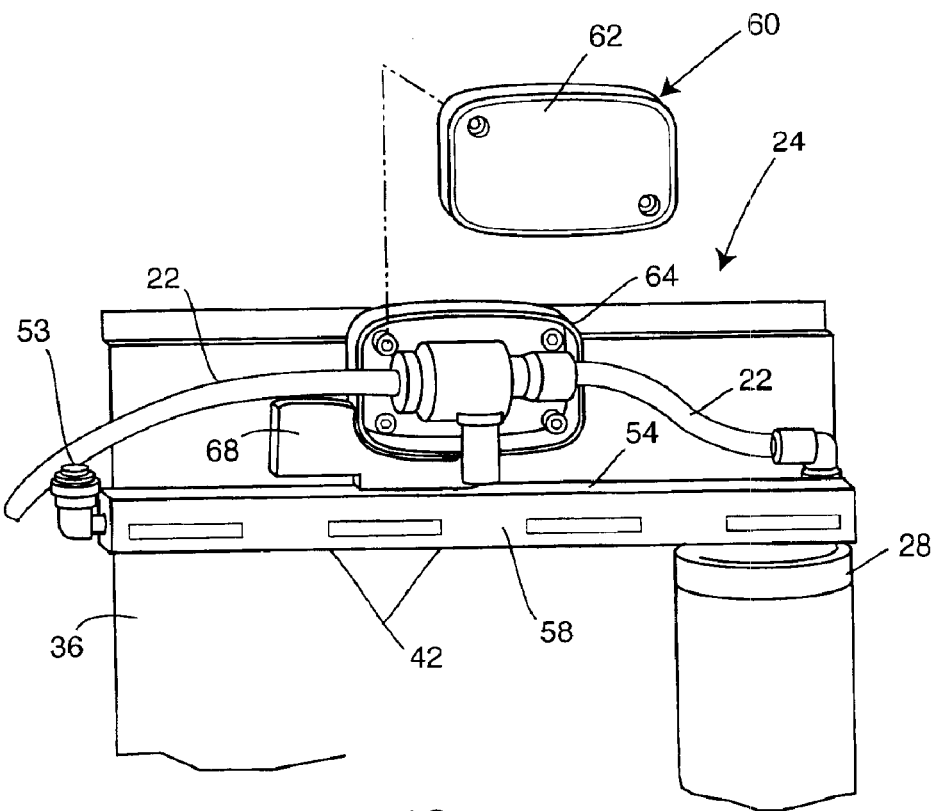
FIG. 7 is an exploded perspective view similar to FIG. 6, and showing the shut-off valve unit is in the closed position.
Figure 10:
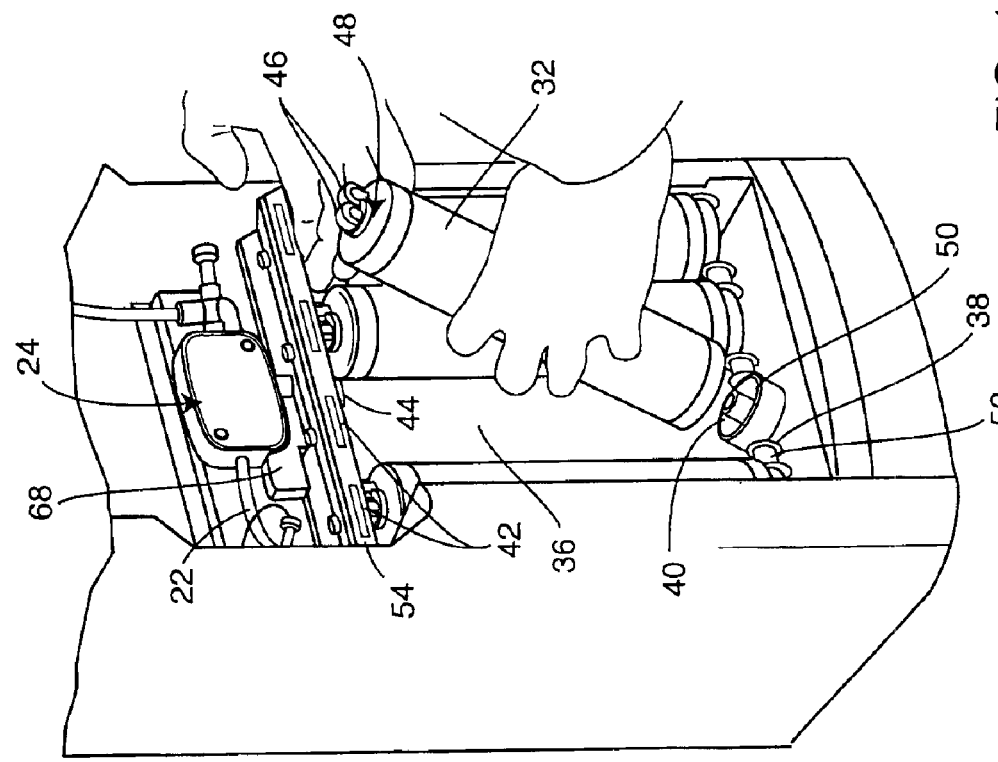
FIG. 10 is a fragmented perspective view similar to FIG. 9, and depicting replacement of a selected filter element when the manifold latch plate is in the unlatched position.

The filter cartridges 28, 30, 32 and 34 are mounted on a common manifold structure adapted for quick and easy filter element removal and replacement. In this regard, to maintain high quality standards in the produced purified water, it is periodically necessary to replace each filter element in the system. The illustrative drawings show the manifold structure in the form of a vertically extending frame plate 36 mounted securely within the cooler cabinet 12 at a location on the inboard side of the front access panel 18. The frame plate 36 carries a lower row of pivotally mounted support brackets 38 each including a support ring 40 (FIG. 10) for removably receiving and retaining a matingly shaped boss (not shown) at the lower end of each filter cartridge. The frame plate 36 additionally carries an upper row of pivotally mounted connector caps 42 (FIG. 10) for releasible coupling to the upper ends of the filter cartridges, wherein these connector caps 42 include appropriate pairs of flow couplers 44 for slide-fit connection to an associated pair of fittings 46 at the upper end or head 48 of each filter cartridge. In this regard, the lower support bracket 38 associated with the reverse osmosis membrane cartridge 32 may include a flow coupler 50 (FIG. 10) for coupling the waste or brine output from the RO cartridge 32 via a discharge line 52 to a suitable drain. A fitting 53 (FIGS. 6 and 7) is provided at the discharge side of the carbon filter cartridge 34 for coupling the purified water flow to the reservoir 14, wherein this fitting 53 may desirably be associated with a check valve (not shown) to prevent water backflow to the filter manifold when one or more of the filter cartridges are removed for replacement, as will be described.

Figure 9:
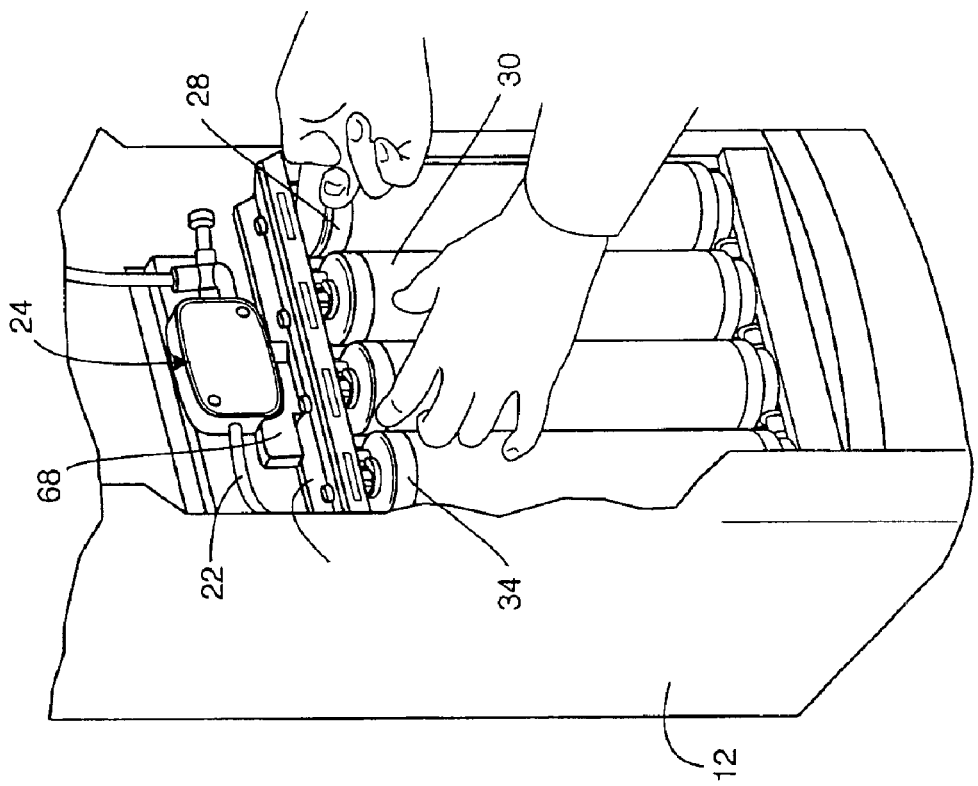
FIG. 9 is a fragmented perspective view similar to FIG. 8, and showing manual grasping of a selected filter element for removal when the manifold latch plate is in the unlatched position.
Figure 8:
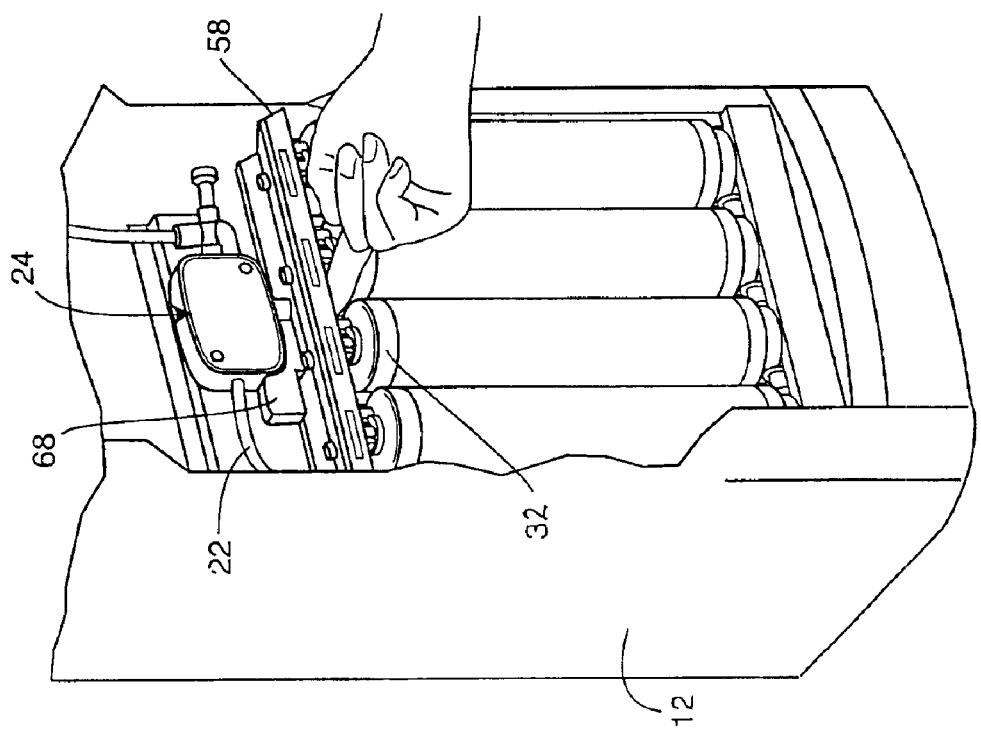
FIG. 8 is a fragmented perspective view similar to FIG. 5, and illustrating manual displacement of a manifold latch plate from a normal latched position to an unlatched position.
Figure 11:
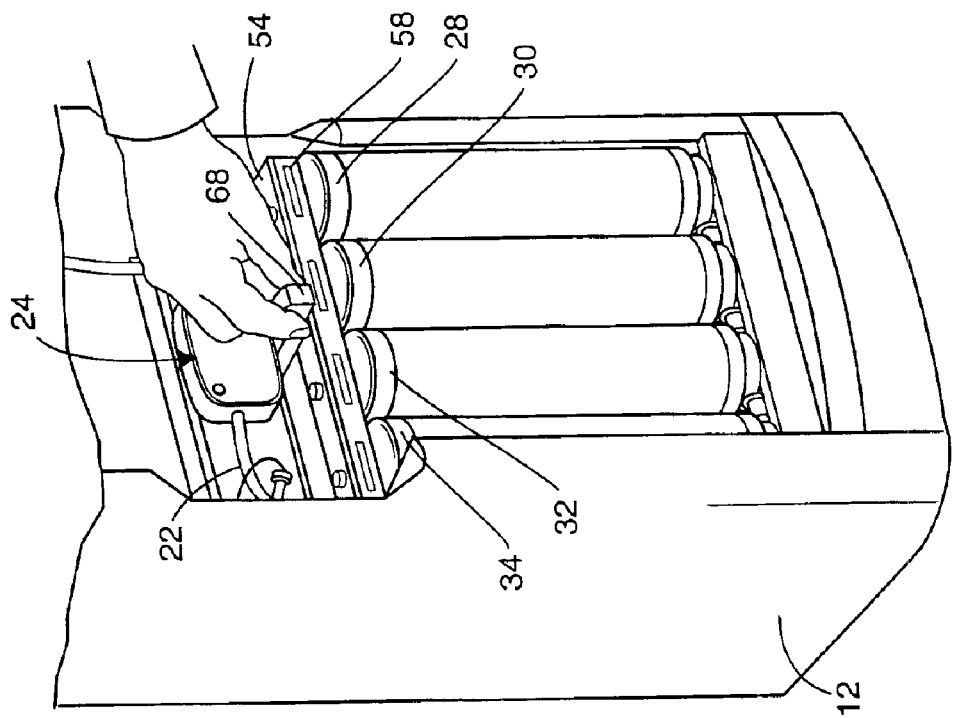
FIG. 11 is a fragmented perspective view similar to FIG. 10, and showing the manifold latch plate returned to the normal latched position, and the shut-off valve returned to the normal open position.

The upper connector caps 42 cooperate with the lower support brackets 38 to define a side-by-side row of four filter element mounting stations within the filter manifold. The upper connector caps 42 each pivot relative to the frame plate 36 between a raised or unlatched position and a lowered or latched position overlying a forward or outboard side of the associated filter element head 48 to retain the head fittings 46 thereon in flow-coupled relation with the flow couplers 44 on the connector caps 42. The connector caps 42 conveniently include detent latch ribs (not shown) for releasibly engaging the associated filter element heads 48, as described. Each connector cap 42 can be pivotally lifted from the latched position to a raised or unlatched position (FIGS. 8–10) released from the associated filter element head 48, whereupon the filter element can be rotated outwardly (FIG. 10) for removal and replacement. The associated lower support brackets 38 rotate outwardly (as viewed in FIG. 10) to accommodate and facilitate such filter element changeover. Further construction and operational details of the filter manifold may be found in U.S. Pat. Nos. 5,591,332 and 5,744,030, which are incorporated by reference herein.

In accordance with one aspect of the present invention, the upper connector caps 42 are connected to an overlying latch plate 54 by means of screws 56 or the like. As illustrated, this latch plate 54 conveniently includes a depending flange 58 at an outboard side thereof to overlie the upper ends of the installed filter cartridges, wherein this flange 58 desirably carries suitable indicia preferably to include color coding associated with the filter cartridges to insure that the correct filter cartridges are installed into the correct mounting stations. The latch plate 54 is pivotally movable with the connector caps 42 between the lowered latched position and the raised unlatched position, whereby the latch plate 54 provides a common structure for locking and unlocking the bank of filter cartridges together.

The shut-off valve 24 is mounted on the manifold frame plate 36 at a position directly above the latch plate 54, and in-line along the length of the water supply conduit 22. As shown, the shut-off valve comprises a suitable ball-type or other valve operator 59 (FIGS. 6–7) mounted in-line with the water supply conduit 22 and seated within a compact case 60 having a front shell 62 mounted onto a base shell 64 by screws 66 or the like. The valve operator 59 includes an elongated actuator lever 68 accessible from the exterior of the case 60. Importantly, this actuator lever 68 is positioned substantially directly above the latch plate 54 and is shaped for mechanically obstructing and preventing latch plate movement to the unlatched position, when the actuator lever 68 is in a normal open position permitting water inflow to the filter manifold. Accordingly, the actuator lever 68 provides a simple yet effective locking means for releasably preventing filter cartridge removal from the filter manifold.

More specifically, as shown best in FIGS. 2–4, 6 and 11, the actuator lever 68 protrudes forwardly from the valve case 60 when the valve operator 59 is in the normal open position. In this position, the actuator lever 68 rests substantially directly on top of the latch plate 54 and thereby locks the latch plate in the lowered latched position. Accordingly, when the shut-off valve 24 is open for normal system operation to produce purified water, the latch plate 54 is lockingly engaged and retained with the filter cartridges to prevent removal of any one of the filter cartridges from the filter manifold. Thus, a filter cartridge cannot be accidentally removed due to oversight in forgetting to first shut off the water inflow, or due to attempted vandalism or unsupervised children.

When it is desired to remove and replace any one or all of the filter cartridges, it is first necessary to rotate the actuator lever 68 from the open position to a closed position (FIGS. 5 and 7–10). In this position, the actuator lever 68 is shifted to a position substantially parallel with and closely abutting the upright frame plate 36, whereat the actuator lever 68 does not obstruct upward movement of the latch plate 54 to the raised, unlatched position. As previously described, in the unlatched position, each one of the filter cartridges can be quickly and easily removed and replaced. When resumed system operation is desired, the latch plate 54 is returned to the lowered, latched position to re-lock the filter cartridges in place. If one or more of the filter cartridges is partially but not fully and properly installed and seated in place, the latch plate 54 cannot be shifted fully to the lowered and latched position whereby the actuator lever 68 cannot be rotated back to the open position. When all of the filter cartridges are fully and properly installed, the actuator lever 68 is then rotated back to the open position for resumed water inflow to the purification system, and to re-lock the latch plate in the latched position.

The improved filter manifold and related shut-off valve of the present invention thus positively safeguards against removal of any one of the filter elements without first shutting off the incoming water supply.

A variety of further modifications and improvements in and to the present invention will be apparent to those persons skilled in the art. For example, alternative locking structures may be employed for releasably retaining the latch plate 54 in the lowered and latched position engaged with the filter cartridges, such as a rotatable actuator lever provided independent of an associated shut-off valve. Further alternative locking means may include a bracket structure shaped to overlie and engage the latch plate 54, wherein the bracket structure is movable or removable upon removal of one or more screws to permit shifting of the latch plate to the raised and unlatched position. Accordingly, no limitation on the invention is intended by way of the foregoing description and accompanying drawings, except as set forth in the appended claims.

What is claimed is:

1. A water purification system, comprising:
   a water supply conduit;
   a filter manifold defining at least one filter element mounting station for receiving and supporting at least one filter element, said filter manifold further including flow coupler means for connecting said at least one filter element with said water supply conduit to produce purified water;
   a latch plate at one end of said at least one filter element mounting station and movable toward and away from said one end between a latched position engaging and retaining said at least one filter element in said at least one mounting station, and an unlatched position permitting removal and replacement of said at least one filter element; and
   lock means at said one end of said at least one filter element mounting station and movable between a first position engaging and preventing movement of said latch plate from said latched position to said unlatched position, and a second position disengaged from and thereby permitting separate movement of said latch plate between said latched and unlatched positions, said lock means further including and mechanically coupled to a shut-off valve for shutting off water flow through said water supply conduit to said filter manifold when said lock means is in said second position said latch plate being interposed between said lock means and said one end of said at least one filter element mounting station.

2. The water purification system of claim 1 wherein said locks means comprises an actuator lever having one end connected to said shut-off valve for controlling water flow through said water supply conduit to said filter manifold, said actuator lever in said first position obstructing and preventing movement of said latch plate from said latched position to said unlatched position and further setting said shut-off valve in an open position, said actuator lever in said second position permitting movement of said latch plate between said latched and unlatched positions and further setting said shut-off valve in a closed position.

3. The water purification system of claim 1 wherein said filter manifold defines a plurality of filter element mounting stations, and further wherein said at least one filter element comprises a plurality of filter elements for mounting respectively at said mounting stations.

4. The water purification system of claim 3 wherein said plurality of filter elements includes a reverse osmosis cartridge.

5. The water purification system of claim 1 wherein said filter manifold comprises a frame, said latch plate being pivotally mounted to said frame for movement between said latched and unlatched positions.

6. The water purification system of claim 5 wherein said lock means is mounted on said frame for movement between said first and second positions.

7. In a water purification system having a filter manifold defining at least one filter element mounting station, at least one filter element removably mounted at said at least one mounting station, and flow coupler means for connecting said at least one filter element to a water supply to produce purified water, the improvement comprising:

a latch plate at one end of said at least one filter element mounting station and movable toward and away from said one end between a latched position engaging and retaining said at least one filter element in said at least one mounting station, and an unlatched position permitting removal and replacement of said at least one filter element relative to said at least one mounting station; and shut-off valve means at said one end of said at least one filter element mounting station and including a valve movable between open and closed positions respectively permitting and preventing water flow to said at least one filter element, and actuator means movable between first and second positions and mechanically coupled to said valve for respectively moving said valve between said open and closed positions, said actuator means in said first position engaging said latch plate to obstruct and prevent movement thereof from said latched position to said unlatched position, said actuator means in said second position being disengaged from and thereby permitting separate movement of said latch plate between said latched and unlatched positions, said latch plate being interposed between said actuator means and said one end of said at least one filter element mounting station.

8. The water purification system of claim 7 wherein said filter manifold defines a plurality of filter element mounting stations, and further wherein said at least one filter element comprises a plurality of filter elements for mounting respectively at said mounting stations.

9. The water purification system of claim 7 wherein said filter manifold comprises a frame, said latch plate being pivotally mounted to said frame for movement between said latched and unlatched positions.

10. A water purification system, comprising:

a water supply conduit;

a filter manifold defining a plurality of filter element mounting stations arranged generally in-line for receiving and supporting a corresponding plurality of filter elements, said filter manifold further including flow coupler means for connecting said filter elements with said water supply conduit to produce purified water;

a latch member at one end of said plurality of filter element mounting stations and movable toward and away from said one end between a latched position engaging and retaining said filter elements at said mounting stations, and an unlatched position permitting removal and replacement of said filter elements; and shut-off valve means at said one end of said plurality of filter element mounting stations and including a valve mounted along said water supply line and movable between open and closed positions respectively permitting and preventing water flow to said filter manifold, and actuator means movable between first and second positions and mechanically coupled to said valve for respectively moving said valve between said open and closed positions, said actuator means in said first position engaging said latch member to obstruct and prevent movement thereof from said latched position to said unlatched position, said actuator means in said second position being disengaged from and thereby permitting separate, movement of said latch member between said latched and unlatched positions, said latch member being interposed between said actuator means and said one end of said plurality of filter element mounting stations.

11. The water purification system of claim 10 wherein said filter manifold comprises a frame, said latch member comprising a latch plate pivotally mounted to said frame for movement between said latched and unlatched positions.

12. The water purification system of claim 11 wherein said actuator comprises an elongated lever having one end connected to said valve, said actuator lever in said first position obstructing and preventing movement of said latch plate from said latched position to said unlatched position and further setting said shut-off valve in an open position, said actuator lever in said second position permitting movement of said latch plate between said latched and unlatched positions and further setting said shut-off valve in a closed position.

* * * * *